United States Patent [19]

Terada et al.

[11] 3,917,859
[45] Nov. 4, 1975

[54] EDIBLE OIL IN WATER IN OIL EMULSION

[75] Inventors: Kimio Terada; Satoshi Fujita; Hiroshige Kohno; Hiromu Sugiyama, all of Tokyo, Japan

[73] Assignee: Asahi Denka Kogyo Kabushiki Kaisha, Japan

[22] Filed: July 19, 1973

[21] Appl. No.: 380,733

[30] Foreign Application Priority Data
July 21, 1972  Japan............................... 47-72493

[52] U.S. Cl. ................ 426/602; 426/612; 426/613; 426/585
[51] Int. Cl............................................... A23d 5/00
[58] Field of Search ........... 426/194, 195, 196, 202, 426/339, 340, 362, 189; 252/356

[56] References Cited
UNITED STATES PATENTS

| | | | |
|---|---|---|---|
| 1,936,718 | 11/1933 | Jordan ................................ | 426/195 |
| 2,198,212 | 5/1940 | Mushen .............................. | 426/362 |
| 2,223,558 | 12/1940 | Epstein ............................... | 426/202 |
| 2,787,550 | 4/1957 | Struble............................... | 426/340 |
| 2,961,320 | 11/1960 | Cuthbertson ...................... | 426/194 |
| 3,223,532 | 12/1965 | Pinkalla ............................. | 426/202 |
| 3,266,904 | 8/1966 | Duin et al. ........................ | 426/196 |
| 3,391,002 | 7/1968 | Little ................................. | 426/362 |

FOREIGN PATENTS OR APPLICATIONS

| | | | |
|---|---|---|---|
| 1,492,955 | 1/1970 | Germany ........................... | 426/340 |
| 4,615,661 | 3/1965 | Japan.................................. | 426/340 |
| 379,261 | 10/1959 | Japan.................................. | 426/340 |
| 423,062 | 6/1960 | Japan.................................. | 426/340 |
| 1,091,593 | 3/1964 | United Kingdom | |
| 358,638 | 7/1960 | Japan.................................. | 426/340 |

*Primary Examiner*—Samih N. Zaharna
*Assistant Examiner*—Ernest G. Therkorn
*Attorney, Agent, or Firm*—Wenderoth, Lind & Ponack

[57] ABSTRACT

This invention relates to an edible emulsion comprising about 20–80% by weight of a continuous oil phase and about 20–80% by weight of a dispersed phase which is itself a stabilized oil-in-water dispersion comprising fat having a Solid Content Index at 0°C of not more than 50, in an amount of about 10–40% by weight of said emulsion and an aqueous phase, in an amount of about 10–40% by weight of said emulsion, containing (a) water-soluble protein, in an amount of about 0.05–1.0% by weight of said emulsion, said emulsion containing (b) a sucrose fatty acid ester having a HLB value of at least 10, in an amount of about 0.1–5.0% by weight of said emulsion, the weight proportion of (a) to (b) ranging from about 1 : 1 to about 1 : 5.

6 Claims, 1 Drawing Figure

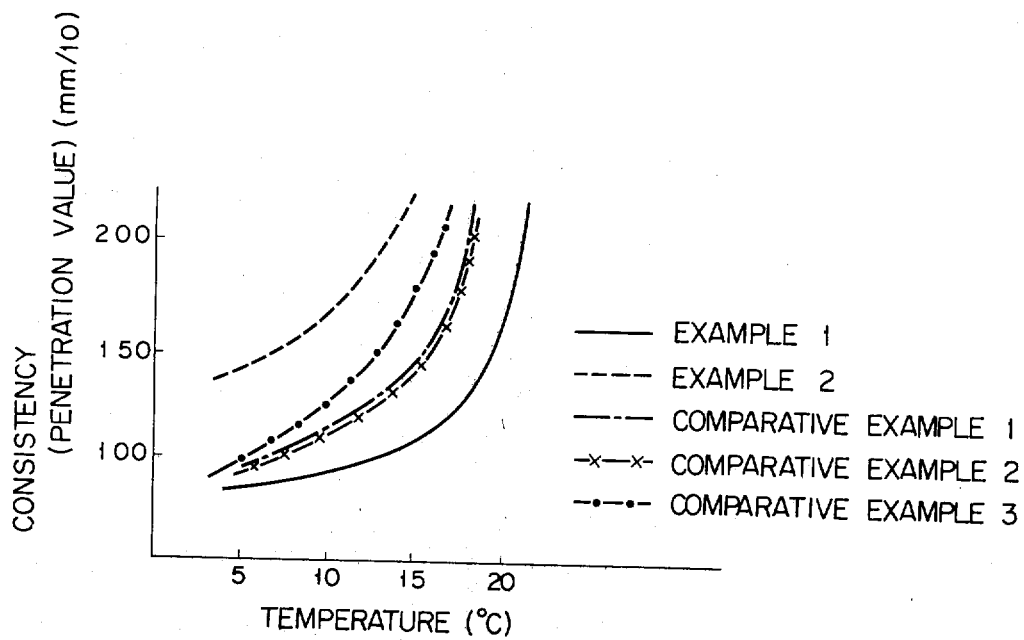

AN EDIBLE OIL IN WATER IN OIL EMULSION

The method of preparing an edible emulsion comprises the stages of (A) forming an oil-in-water dispersion by mixing an aqueous phase, in an amount of about 10 – 40% by weight of said emulsion and containing (a) water-soluble protein, in an amount of about 0.05 – 1.0% by weight of said emulsion, and (b) a sucrose fatty acid ester having a HLB value of at least 10, in an amount of about 0.1 – 5.0% by weight of said emulsion, with fat having a Solid Content Index at 0°C of not more than 50, in an amount of about 10 – 40% by weight of said emulsion, and homogenizing said dispersion; (B) forming an oil-in-water-in-oil type emulsion by mixing said dispersion with an oil phase, in an amount of about 20 – 80% by weight of said emulsion; and (c) rapidly cooling the resulting emulsion to effect solidification of the components of said oil phase.

This invention relates to a stable and edible oil-in-water-in-oil (o/w/o) type emulsion comprising a continuous oil phase and a dispersed phase which is itself a stabilized dispersion of an oil phase in an aqueous phase.

In this specification, the terms "oil" and "fat" are used synonymously.

The method of preparing an edible oil-in-water-in-oil type emulsion is well known in the art and is shown in Japanese Pat. No. 270,404, Japanese Pat. No. 306,911, Japanese Pat. No. 501,127 and Japanese Pat. Publication No. 46-15,661.

The emulsion can be prepared by the above known method, but the emulsion does not have the same character as the oil-in-water-in-oil emulsion has originally, since the emulsion comprising the inner oil phase and aqueous phase is unstable and consequently a large part of the inner oil phase is combined with the outer oil phase during preparation of the emulsion and a small amount of the inner oil phase remains in the product. When the product of the above mentioned method is heated slowly to separate into the outer oil phase and the oil-in-water emulsion in which the inner oil phase is dispersed in the aqueous phase, it is apparent, as shown in Table 1, that the ratio of the inner oil phase to the outer oil phase in the product is independent of the ratio of the inner oil phase to the outer oil phase, which is used in the process of preparing the same, since a large part of the inner oil phase is combined with the outer oil phase during the preparation of the emulsion because of the instability of the dispersed emulsion comprising the inner oil phase and the aqueous phase.

Table 1

| | The mixing ratio of the inner oil phase/the aqueous phase/ the outer oil phase in preparing the emulsion | The ratio of the inner oil phase/the aqueous phase/the outer oil phase in the product |
|---|---|---|
| Ex. 1 | 29.0 / 17.0 / 54.0 | 1.0 / 17.0 / 82.0 |
| Ex. 2 | 33.3 / 16.7 / 50.0 | 1.3 / 16.7 / 82.0 |
| Ex. 3 | 34.2 / 18.7 / 47.1 | 1.3 / 18.7 / 82.0 |
| Ex. 4 | 33.5 / 18.1 / 48.4 | 0.9 / 18.1 / 81.0 |

Ex. 1 Example of Japanese Patent No. 270404
Ex. 2 Example of Japanese Patent No. 306911
Ex. 3 Example of Japanese Publication No. 46-15661
Ex. 4 Example of Japanese Publication No. 46-15661

The emulsion which is prepared by the known method appears to be the oil-in-water-in-oil under a microscope, but the character of the emulsion is similar to that of a water-in-oil type emulsion.

We have researched into the above mentioned defect and have discovered that it is caused by the emulsifier used and that the stability of the oil-in-water-in-oil type emulsion depends on the emulsifier which is used in the dispersed oil-in-water type emulsion. The emulsifier used in the known method is as follows:

Table 2

| | The emulsifier in the dispersed oil-in-water type emulsion | |
|---|---|---|
| | Essential components | Components used together |
| Japanese Patent No. 270404 | Propylene glycol alginate | Lecithin Monoglyceride |
| Japanese Patent No. 306911 | Milk casein Polyphosphate | — |
| Japanese Patent No. 501127 | Casein-Sodium tripolyphosphate or Propylene glycol alginate | — |
| Japanese Publication No. 46-15661 | Water-soluble protein Phosphate | Monoglyceride, Polyglyceride Span. Tween |

As shown in Table 2, the emulsifier used in the dispersed oil-in-water emulsion in the known method is composed primarily of an emulsifier such as propylene glycol alginate, a combination of casein and phosphate together with an emulsifier such as lecithin, monoglyceride, diglyceride, polyglyceride, partial ester of polyhydric alcohol anhydride and fatty acid (Span), or partial ester of polyhydric alcohol polyoxyethylene ether and fatty acid (Tween).

Our research has revealed that phosphate reduces the stability of the dispersed oil-in-water emulsion, causing breaking of the oil-in-water during preparation of the oil-in-water-in-oil emulsion, when phosphate is used together with casein in forming the oil-in-water emulsion. We have discovered that sucrose fatty acid ester improves the stability of the dispersed oil-in-water type emulsion, when sucrose fatty acid ester instead of phosphate is used together with casein.

An object of this invention is to provide an edible oil-in-water-in-oil type emulsion having a dispersed phase which is a stabilized oil-in-water type emulsion.

A further object of this invention is to provide an edible oil-in-water-in-oil type emulsion which can contain a large amount of the dispersed oil-in-water emulsion without breaking the emulsion.

EXPLANATION OF THE DRAWING

FIG. 1 shows curves illustrating the consistency vs. temperature with respect to the products obtained by Examples 1 – 2 and Comparative Examples 1 – 3.

The edible emulsion of this invention comprises about 20 – 80 % by weight of a continuous oil phase and about 20 – 80 % by weight of a dispersed phase which is itself a stabilized oil-in-water dispersion comprising fat having a Solid Content Index at 0°C of not more than 50, in an amount of about 10 – 40% by weight of said emulsion and an aqueous phase, in an amount of about 10 – 40 % by weight of said emulsion containing (a) water-soluble protein, in an amount of about 0.05 – 1.0 % by weight of said emulsion, said emulsion containing (b) a sucrose fatty acid ester having a HLB value of at least 10, in an amount of about 0.1 – 5.0 % by weight of said emulsion, the weight proportion of (a) to (b) ranging from about 1 : 1 to about 1 : 5.

The method of preparing the edible emulsion of this invention comprises (1) forming an oil-in-water dispersion by mixing an aqueous phase, in an amount of about 10 – 40 % by weight of said emulsion containing (a) water-soluble protein, in amount of about 0.05 – 1.0 % by weight of said emulsion, and (b) a sucrose fatty acid ester having an HLB value of at least 10, in amount of about 0.1 – 5.0 % by weight of said emulsion, with fat having a Solid Content Index at 0°C of not more than 50, in an amount of about 10 – 40 % by weight of said emulsion and homogenizing said dispersion at a temperature of above the melting point of the fat; (2) forming an oil-in-water-in-oil type emulsion by mixing said dispersion with an oil phase, in an amount of about 20 – 80 % by weight of said emulsion; and (3) rapidly cooling said emulsion to effect solidification of components of said oil phase.

The water soluble protein for use in this invention may be protein such as milk protein or soybean protein, which predominantly comprises casein. Casein such as milk casein, sodium caseinate, calcium caseinate or acid precipitated casein may also be used. The casein may also be made in situ from skimmed milk or skimmed milk powder. There is no necessity to use sequestering agent for calcium ion or polyphosphate together.

The amount of the water soluble protein is about 0.05 – 1.0 % by weight of the final product, preferably about 0.5 – 1.0 % by weight of the aqueous phase. The sucrose fatty acid ester which is used together with the water soluble protein has a HLB of at least 10 or thereabouts, and preferably within the range 11 – 17 and it is composed primarily of monoester of sucrose and saturated and/or unsaturated fatty acid containing 12 to 22 carbon atoms, together with smaller amounts of their diesters and triesters. The sucrose fatty acid ester contains monoester in an amount of at least about 40 % when the combined fatty acid is saturated and/or unsaturated fatty acid containing 12 carbon atoms being in an amount of at least about 50 %, when the combined fatty acid is saturated fatty acid containing 16 carbon atoms, and in an amount of at least 50 %, preferably at least 60 %, and when the combined fatty acid is the mixture of fatty acid containing 12 to 22 carbon atoms.

Even when the amount of monoester in the sucrose fatty acid ester is below 50 %, the stable oil-in-water emulsion can be prepared but the oil-in-water emulsion is broken during the preparation of the oil-in-water-in-oil emulsion by mixing the oil-in-water emulsion with the continuous oil phase. Generally, the emulsifier for use in preparing oil-in-water emulsion is preferred to have an HLB of about 7 – 9, but in the case of sucrose fatty acid ester, sorbitan fatty acid ester, polyoxyethylene sorbitan fatty acid ester and mixtures thereof, this HLB value of 7 – 9 is unsuitable for preparing the stable oil-in-water-in-oil type emulsion. The emulsifier for use in preparing the stable oil-in-water-in-oil type emulsion of this invention must be sucrose fatty acid ester having an HLB of at least about 10, and preferably about 11 – 17. The amount of the sucrose fatty acid for use in this invention is about 0.1 – 5.0 %, preferably such an amount that the weight proportion of the water soluble protein and the sucrose fatty acid ester is from about 1 : 1 to about 1 : 5, preferably from about 1 : 2 to about 1 : 4. It is unsuitable to add emulsifier such as glycerol fatty acid ester, lecithin, sorbitan fatty acid ester or propylene glycol fatty acid ester to the emulsifier system for use in this invention comprising the water-soluble protein and the sucrose fatty acid ester.

In the known method, it is necessary to use the sequestering agent for calcium ion such as phosphate, because the large amount (at least about 5 % by weight of the aqueous phase) of casein used. The addition of a large amount of phosphate makes the dispersed oil-in-water emulsion unstable and spoils the taste of the emulsion. In this invention, the amount of water-soluble protein such as casein is decreased remarkably by using the specified sucrose fatty acid ester together with it and consequently there is no necessity to use sequestering agent such as phosphate for the calcium ion. Thus the stabilization of the dispersed oil-in-water emulsion is greatly improved.

The fat for use in this invention, which forms the inner-oil phase, has a Solid Content Index (SCI) at 0°C of not more than 50, and preferably not more than 30. Examples of the fat which can be used in this invention include soybean oil, cottonseed oil, corn oil, safflower oil, palm oil, rapeseed oil, kapok oil, butter, lard, tallow, fish oil, whale oil, and the like, and the hardened oil which is obtained by hydrogenating the above material and the mixture thereof. Fats such as coconut oil and extremely hardened oil are unsuitable because they having an SCI at 0°C of at least 50, but they can be used in mixture with the other fats to form a compound having an SCI at 0°C of not more than 50. When the fat has an SCI at 0°C of at least 50, the emulsion is broken partially while cooling rapidly and plasticizing the emulsion.

The emulsifier for use in dispersing the oil-in-water type emulsion in the continuous phase may be an emulsifier such as glycerol fatty acid ester, lecithin, propylene glycol fatty acid ester, sorbitan fatty acid ester and sucrose fatty acid ester, or, in preference to this, sucrose fatty acid ester and glycerol fatty acid ester containing unsaturated fatty acid groups, or, even better still, sucrose fatty acid ester having an HLB of about 1 – 4.

The process of preparing the edible emulsion of this invention is as follows. Initially, the fat is mixed with the aqueous phase containing the water-soluble protein and the sucrose fatty acid ester in a mixing machine such as a "Satake" type mixer, a "Homomixer" or a "Homogenizer," being at a temperature of at least the melting point of the fat, preferably about 40°– 80°C, to form the oil-in-water type emulsion, and the resulting emulsion is homogenized to obtain a fat particle size of not more than 5 microns, preferably about 0.5 – 2 microns. Then the oil-in-water emulsion is dispersed in the fat, which forms a continuous oil phase of the final product at a temperature of at least the melting point of the fat, preferably about 40°– 60°C. The resulting mixture is rapidly cooled and plasticized, either by passing through a tubular cooler or putting in contact with a cooling drum to obtain the final product. The process of cooling rapidly and plasticizing the resulting mixture can be conducted by using a device such as "Votator," "Perfector," "Kombinator," or "Complector," preferably being a device closed system for cooling and plasticizing continuously.

The weight proportion between the inner oil phase and the aqueous phase and the outer oil phase is as follows.

As shown in Table 1, the known oil-in-water-in-oil type emulsion has the weight proportion between the inner oil phase, the aqueous phase and the outer oil phase shown in Table 3.

Table 3

|  | The inner oil phase | | The aqueous phase | | The outer oil phase | | The dispersed oil/The outer in-water emulsion/oil phase | | | |
| --- | --- | --- | --- | --- | --- | --- | --- | --- | --- | --- |
| Ex. 1 | about | 29% | about | 17 % | about | 54% | about | 46% / | about | 54% |
| Ex. 2 |  | 33.3% |  | 16.7% |  | 50.0% |  | 50% / |  | 50% |
| Ex. 3 |  | 32.9% |  | 17.8% |  | 49.3% |  | 50.7% / |  | 49.3% |
| Ex. 4 |  | 34.2% |  | 18.7% |  | 47.1% |  | 52.9% / |  | 47.1% |
| Ex. 5 |  | 33.5% |  | 18.1% |  | 48.4% |  | 51.6% / |  | 48.4% |

Ex. 1 Example of Japanese Patent No. 270404
Ex. 2 Example of Japanese Patent No. 306911
Ex. 3 Example of Japanese Patent No. 501127
Ex. 4 Example 1 – 2 of Japanese Publication No. 46-15661
Ex. 5 Example 3 – 6 of Japanese Publication No. 46-15661

However, the weight proportion of the inner oil phase, the aqueous phase and the outer oil phase of the emulsion of this invention is about 10 – 40: about 10 – 40: about 20 – 80 and the weight proportion of the dispersed oil-in-water emulsion and the outer continuous phase is about 80 – 20 : 20 – 80. The emulsion of this invention can contain a larger amount of the dispersed oil-in-water emulsion than the known emulsion. The known emulsion cannot contain the dispersed oil-in-water emulsion in as large amount as the emulsion of this invention, since the dispersed oil-in-water emulsion of the known emulsion has high viscosity as shown in Table 4 because of the use of a large amount of water soluble protein such as casein.

Table 4

| The weight proportion of the inner oil phase and the aqueous phase | The known | The method of this invention |
| --- | --- | --- |
| o/w = 50/50 | method 2000 c.p.s. Emulsification Impossible because of high viscosity | 100 c.p.s. |
| o/w = 80/20 |  | 660 c.p.s. |

1. Viscosity of the emulsion is determined at 20°C by using a B-type rotary viscosimeter with No. 3 rotor rotating at a speed of 60 r.p.m.
2. The known method comprises adding sodium caseinate 8% and polyphosphate 2% to water to form an aqueous phase and emulsifying soybean oil in the aqueous phase.
3. The method of this invention comprises adding sodium caseinate 0.7% and sucrose fatty acid ester having a HLB of 11, 1.5% to form an aqueous phase and emulsifying soybean oil in the aqueous phase.

The decrease in the viscosity of the oil-in-water emulsion, improves the stability of the oil-in-water emulsion and enables a larger maximum amount of the oil-in-water emulsion to be added to the outer oil phase. The known method is defective in that it uses an unsatisfactory an emulsifier and moreover does not enable the formation of the oil-in-water emulsion because of a noticeable increase in the viscosity of the emulsion in proportion to the increase in the amount of the inner oil phase when a larger amount of the oil-in-water emulsion is added to the outer oil phase. In this invention, the viscosity of the oil-in-water emulsion is not noticeably increased because a smaller amount of water-soluble protein such as casein is used. Therefore the viscosity of the oil-in-water emulsion is not noticeably increased even when the amount of the inner phase is increased by adding a larger amount of the oil-in-water to the continuous oil phase, and it is possible to form a stable oil-in-water emulsion and consequently to add a large amount of oil-in-water emulsion to the outer oil phase to form a stable oil-in-water-in-oil emulsion.

If necessary, the emulsion of this invention may contain additives such as milk products, flavoring materials, coloring materials, stabilizing agents, thickening agents, spices, vitamins, organic acids and the like.

The following examples are given to demonstrate the preparation of the emulsion of this invention disclosed herein. These examples are not intended as limitations upon the invention.

EXAMPLE 1

The aqueous phase is prepared by adding 2 kg of sodium caseinate, 6 kg of sucrose fatty acid, having an HLB value of about 11 and 2 kg of sodium chloride, to 290 kg of water and dissolving them in the water. Then, 300 kg of soybean oil is added to the aqueous phase to form an oil-in-water emulsion and the emulsion is homogenized at a temperature of 60°C by passing it twice through pressure-type homogenizer at 150 kg/cm$^2$ pressure to obtain a dispersed particle size of about 1 – 2 microns.

The oil-in-water emulsion is added with agitation to the oil phase which is separately prepared by adding 2 kg of monoglyceride and 1 kg of lecithin to a hardened soybean oil having a melting point of 36°C and dissolving them in the oil at a temperature of 60°C to form an oil-in-water-in-oil emulsion. The resulting emulsion is rapidly cooled and plasticized by passing it through a Votator to produce the final product. The composition of the sucrose fatty acid having a HLB value of about 11 used in this Example is as follows.

| Composition of combined fatty acid | | Composition of ester | |
| --- | --- | --- | --- |
| Stearate about 65% | Palmitate about 35% | Monoester about 60% | Di-and Triester about 40% |

The weight proportion of the sodium caseinate and the sucrose fatty acid ester having an HLB value of 11 is 1 : 3.

EXAMPLE 2

The procedure of Example 1 is followed, but a hardened soybean oil having a melting point of 36°C is used as the dispersed oil phase and an oil phase comprising 397 kg of soybean oil, 2 kg of monoglyceride and 1 kg of lecithin, is used as the continuous oil phase.

COMPARATIVE EXAMPLE 1

The method of Example 1 is followed, but the aqueous phase is prepared by adding 20 kg of casein, 5 kg of sodium triphosphate and 5 kg of sodium chloride to 270 kg of water and dissolving them in the water, and the resultant aqueous phase is used instead of the aqueous phase of Example 1.

COMPARATIVE EXAMPLE 2

The method of Example 1 is followed, but a sucrose fatty acid ester having an HLB of about 9 is used instead of the sucrose fatty acid ester having an HLB of about 11 of Example 1.

The composition of the sucrose fatty acid having an HLB value of about 9 used in this Comparative Example is as follows.

| Composition of combined fatty acid | | Composition of ester | |
|---|---|---|---|
| Stearate about 70% | Palmitate about 30% | Monoester about 40% | Di-and Triester about 60% |

COMPARATIVE EXAMPLE 3

The oil phase is prepared by mixing the dispersed oil (inner oil phase) phase of Example 1 with the continuous oil phase (outer oil phase) of Example 1. Then the aqueous phase of Comparative Example 1 is added to the resultant oil phase with agitation to form a water in oil emulsion and the emulsion is cooled rapidly and plasticized to produce the final product.

The respective products of Examples 1–2 and Comparative Examples 1–2 are heated slowly to separate the dispersed oil-in-water emulsion from the continuous oil phase, and the weight proportion of the inner oil phase to the aqueous phase and to the outer oil phase is calculated from the result thereof. The weight proportion is as follows.

Table 5

| | The mixing weight proportion of the inner oil phase/the aqueous phase/the outer oil phase in the process | The weight proportion of the inner oil phase/the aqueous phase/the outer oil phase in the final product |
|---|---|---|
| Example 1 | 30/30/40 | 24/30/46 |
| Example 2 | 30/30/40 | 23/30/47 |
| Comparative Example 1 | 30/30/40 | 4/30/66 |
| Comparative Example 2 | 30/30/40 | 5/30/65 |

The consistency of each product is determined by using A.S.T.M. D-217-60T cone penetrometer with cone angle 60° in which a total load of cone plus rod is 120 grams and reading penetration value by 1/10 mm scale unit for a period of 5 seconds after a pointed end of cone has touched the surface of the emulsion.

The consistency of each product is shown in FIG. 1.

EXAMPLE 3

The method of Example 1 is followed, but the dispersed oil phase is prepared by blending 400 kg of soybean oil with 100 kg of hardened soybean oil and the aqueous phase is prepared by adding 2 kg of sodium caseinate and 4 kg of sucrose fatty acid having an HLB value of about 13 with 244 kg of water and dissolving them in the water with agitation. The continuous oil phase is prepared by adding 3 kg of sucrose fatty acid ester having an HLB value of about 2 to 247 kg of hardened soybean oil having a melting point of about 36°C.

The composition of sucrose fatty acid ester having an HLB value of about 13 is as follows.

| Composition of combined fatty acid | | | Composition of ester | |
|---|---|---|---|---|
| Stearate about 20% | Palmitate About 60% | Oleate about 20% | Monoester about 65% | Di- and Tri-ester about 35% |

The weight proportion of the sodium caseinate to the sucrose fatty acid ester having an HLB value of about 13 is 1 : 2.

The sucrose fatty acid ester having an HLB of about 2 is composed of about 7% of mono- and diester and about 93% of tri- and tetraester.

COMPARATIVE EXAMPLE 4

The aqueous phase is prepared by mixing 15 kg of sodium caseinate and 5 kg of polyphosphate with 230 kg of water. The dispersed oil phase, which is the same as the dispersed phase of Example 3, is added to the aqueous phase with agitation to form an oil-in-water emulsion. Then it is attempted to disperse the oil-in-water emulsion in the oil phase, which is prepared separately by adding 5 kg of glycerol fatty acid ester and 2 kg of lecithin to 243 kg of hardened soybean oil having a melting point of about 36°C, but the oil in water emulsion has so high a viscocity that it cannot be dispersed in the oil phase and an oil-in-water-in-oil type emulsion cannot be obtained.

As shown in Table 5, the weight proportion of the inner oil phase to the aqueous phase and to the outer oil phase in the product of this invention os almost the same as their original weight proportion for mixing in preparing the emulsion, and, in the present invention, the inner phase does not combine with the outer oil phase during the process of preparing the emulsion since the inner oil phase and the aqueous phase form a very stable emulsion. Therefore, when a fat having a higher melting point is used as the outer oil phase and an oil having a lower melting point is used as the inner oil phase, the product of this invention (Example 1) becomes stiffer and softens more abruptly at a specified temperature than the product of the known method (Comparative Example 1–2). The product of the known method such as Comparative Example 1–2 does not have satisfactory stiffness and softens slowly as the temperature rises since the inner oil phase combines with the outer oil phase. The above mentioned character of the product of the known method is similar to the character of water-in-oil emulsions such as the product of Comparative Example 3. The object of preparing a fat composition which has a satisfactory stiffness at below the specified temperature and melts sharply at the specified temperature by forming the oil-in-water-in-oil emulsion using a fat having a lower melting point than the inner oil phase and a fat having a higher melting point than the outer oil phase cannot be achieved by the known method.

When a fat having a higher melting point is used as the inner oil phase and a fat having a lower melting point is used as the outer oil phase, the product of this invention (Example 2) is easy to spread even at low temperatures and is moreover stiff, but the product of the known method is difficult to spread at low temperatures and is not stiff. The character of the product of the known method is similar to the character of water-in-oil emulsions such as product of Comparative Example 3.

What we claim is that:

1. An edible emulsion comprising about 20–80% by weight of a continuous oil phase and about 20–80% by weight of a dispersed phase which is itself a stabilized oil-in-water dispersion comprising fat having a Solid Content Index at 0°C of not more than 50, in an amount of about 10–40% by weight of said emulsion and an aqueous phase, in an amount of about 10–40% by weight of said emulsion, containing (a) water-soluble protein, in an amount of about 0.05–1.0% by weight of said emulsion, said emulsion containing (b) a sucrose fatty acid ester having an HLB value of at least 10, in an amount of about 0.1–5.0% by weight of said emulsion, the weight proportion of (a) to (b) ranging from about 1 : 1 to about 1 : 5.

2. The emulsion of claim 1, wherein the water soluble protein is selected from a group consisting of milk casein, sodium caseinate, calcium caseinate and precipitated casein.

3. The emulsion of claim 1, wherein the sucrose fatty acid ester is composed of at least 50% monoester, together with di- and triesters.

4. The emulsion of claim 1, wherein the emulsion also contains an emulsifier selected from a group consisting of glycerol fatty acid ester, lecithin, propylene glycol fatty acid ester, sorbitan fatty acid ester and sucrose fatty acid ester having an HLB of not more than 10.

5. The emulsion of claim 1, wherein the emulsion also contains a sucrose fatty acid ester having an HLB of about 1–4.

6. The emulsion of claim 1, wherein the particle size of the dispersed oil phase is not more than 5 microns.

* * * * *